United States Patent [19]
Yaeda et al.

[11] 3,891,724

[45] June 24, 1975

[54] ETHYLENE-PROPYLENE TERPOLYMER AND CRYSTALLINE 1,2 POLYBUTADIENE

[75] Inventors: Yasuyuki Yaeda; Yoshishige Chikatsu; Noriaki Ando, all of Yokkaichi; Ryuichi Sakata, Kobe, all of Japan

[73] Assignee: Japan Synthetic Rubber Co., Limited, Tokyo, Japan

[22] Filed: Dec. 11, 1973

[21] Appl. No.: 423,851

[30] Foreign Application Priority Data

Dec. 12, 1972  Japan.............................. 47-124680

[52] U.S. Cl........ 260/889; 260/2.5 HA; 260/28.5 B; 260/29.7 T; 260/29.7 SQ; 260/33.6 AQ; 260/33.6 PQ; 260/42.21; 260/42.33; 260/42.44; 260/45.7 R; 260/45.7 S; 260/94.3

[51] Int. Cl....................... C08f 29/12; C08f 45/54

[58] Field of Search..... 260/888, 889, 2.5 HA, 29.7, 260/29.7 T, 29.7 SQ, 33.6, 33.6 AQ, 33.6 PO, 45.7 R, 42.21, 42.31

[56] References Cited

UNITED STATES PATENTS

| | | | |
|---|---|---|---|
| 3,498,963 | 3/1970 | Ichikawa et al.................... | 260/94.3 |
| 3,741,931 | 6/1973 | Martin et al........................ | 260/889 |

*Primary Examiner*—Murray Tillman
*Assistant Examiner*—J. Ziegler
*Attorney, Agent, or Firm*—Ladas, Parry, Von Gehr, Goldsmith & Deschamps

[57] ABSTRACT

An ethylene-propylene rubber composition comprising 3 to 50 % by weight of at least one 1,2-polybutadiene having a 1,2-addition unit content of at least 70 %, a crystallinity of at least 5 % and an intrinsic viscosity [$\eta$] as measured in toluene at 30°C of at least 0.7 dl/g, and 97 to 50 % by weight of at least one ethylene-propylene-diene terpolymer. The above composition has a high vulcanization rate, a high green strength and an excellent processability.

9 Claims, No Drawings

ETHYLENE-PROPYLENE TERPOLYMER AND CRYSTALLINE 1,2 POLYBUTADIENE

This invention relates to an ethylene-propylene rubber composition. More particularly, this invention relates to a rubber composition having a high vulcanization rate, a high green strength and an excellent processability, comprising a polybutadiene having a 1,2-addition unit content of at least 70 % (referred to hereinafter as 1,2-polybutadiene) and an ethylenepropylene-diene terpolymer (referred to hereinafter as EPDM).

Commercially available ethylene-propylene rubbers, particularly EPDM are excellent in thermal resistance, ageing resistance, weather resistance and ozone resistance, have good electric properties and good cold brittleness, and are similar to natural rubber particularly in behavior of elastic properties on temperatures. Therefore, the EPDM can be vulcanized with sulfur similarly to conventional rubbers. Further, the EPDM can be produced at considerably low cost as compared with conventional diene rubbers, because the starting materials, ethylene and propylene, for the EPDM are supplied in large amounts and at low cost by petrochemical industry. In addition, the EPDM can be extended with a large amount of oil. Thus, the EPDM is advantageous even in the aspect of economy, and hence, is expected as wide-use rubbers in future. However, the EPDM is greatly disadvantageous in processability, i.e., the vulcanization rate is very low and the stickiness is low. Therefore, EPDM is greatly limited in practical use.

The present inventors have extensive research on EPDM having no such disadvantages to find that by blending the specific 1,2-polybutadiene with the EPDM, the above-mentioned disadvantages of the EPDM are removed, the extrudability of the EPDM is improved, and the rubbery properties of vulcanizate of the EPDM are hardly impaired or rather improved.

An object of this invention is to provide an EPDM composition having improved properties.

A further object of the invention is to provide an EPDM composition having a high vulcanization rate, a high green strength and an excellent processability.

A still further object of the invention is to provide an EPDM composition comprising an EPDM and 1,2-polybutadiene.

Other objects and advantages of the invention will be apparent from the following description.

According to this invention, there is provided an EPDM composition comprising 97 to 50 % by weight of at least one EPDM and 3 to 50 % by weight of at least one 1,2-polybutadiene having a 1,2-addition unit content of at least 70 %, a crystallinity of at least 5 % and an intrinsic viscosity of at least 0.7 dl/g as measured in toluene at 30°C.

The 1,2-polybutadienes used in this invention have a 1,2-addition unit content of at least 70 %, preferably at least 85 %. When the 1,2-addition unit content is less than 70 %, the green strength is too low. Further, the crystallinity of the 1,2-polybutadienes is at least 5 %, preferably 5 to 50 %, particularly preferably 10 to 30 %, in view of ease of mixing. When the crystallinity is less than 5 %, the green strength-improving effect is too small, and the physical properties of the vulcanizate of such a composition are not satisfactory. Furthermore, the 1,2-polybutadienes have an intrinsic viscosity as measured in toluene at 30°C of at least 0.7 dl/g, preferably at least 1.0 dl/g. When the intrinsic viscosity is less than 0.7 dl/g, the green strength of the composition is unsatisfactory, and the physical properties of vulcanizate, particularly modulus, are inferior. 1,2-Polybutadienes satisfying the above-mentioned conditions can be produced by the methods disclosed in U.S. Pat. Nos. 3,498,963 and 3,522,332. The above 1,2-polybutadienes may be used alone or in admixture of two or more, or in admixture with such an amount of other 1,2-polybutadienes as not to impair the effect of the invention.

In this invention, the amount of the 1,2-polybutadienes used is 3 to 50 % by weight based on the weight of the rubber compsotion of this invention. When the amount is more than 50 %, the composition is not desirable in respects of resilience and permanent set. When the amount is less than 3 % by weight, substantially no effect of this invention is obtained.

The EPDM used in this invention may be any of those which are commercially available, though those comprising 50 to 80 % by weight of ethylene, 50 to 20 % by weight of propylene and up to 5 % by weight of diene (corresponding to an iodine number of about 50) are preferably used in general. Typical examples of the diene include 1,4-hexadiene, dicyclopentadiene, 5-methylene- 2-norbornene, 5-ethylidene-2-norbornene, 1,5cyclooctadiene, etc. When the propylene content is less than 30 % by weight, the EPDM per se has a great green strength, and in addition, the vulcanization rate and processability of the EPDM are also improved by blending the 1,2-polybutadienes therewith according to this invention. The EPDM may be used alone or in admixture of two or more.

In this invention, the 1,2polybutadiene and the EPDM may be mixed by any known method, for example, by mixing a solution of the 1,2polybutadiene with a solution of the EPDM and then removing the solvents from the resulting mixture, or by conventionally mechanically mixing the 1,2-polybutadiene with the EPDM each in the form of solid by means of, for example, rolls, Banbury's mixer, kneader-blender, or the like.

It is, of course, possible to incorporate into the rubber composition of this invention at least one conventional compounding ingredient, such as reinforcing agents, fillers, extender oils, pigments, vulcanizing agents, vulcanization accelerators, vulcanization activators, antioxidants, ultraviolet absorbers, blowing agents, odorants, softening agents, etc.

The rubber composition of this invention has a high green strength, a high vulcanization rate and a greatly improved processability, such as high extrusion rate and a high stickiness. Further, the vulcanizate of the rubber composition is greatly excellent in hardness and resistance to crack-growing. In addition, the rubbery properties of the EPDM, for instance, resilience and permanent set, are not so much impaired. Therefore, the rubber composition of this invention can be used as elements which are very useful in industry as novel ethylene-propylene type rubber composition.

The invention is further explained below in more detail referring to the following Examples, which are not by way of limitation, but by way of illustration.

The micro-structures of the 1,2-polybutadienes used in the Examples were measured by the infrared absorption spectrum method of D. Morero et al. (Chimie et Ind., 41, 758 (1959)). The crystallinity was determined by the density measurement method in which the following equation was used:

$$\frac{1}{d} = \frac{X}{d_{cr}} - \frac{1-X}{d_{am}}$$

wherein
- $d$: density of the specimen measured at 20°C,
- $d_{cr}$: density of the crystalline region,
- $d_{am}$: density of the amorphous region,
- X: crystallinity in per cent.

The value of $d_{cr}$ used was that of the crystalline 1,2-polybutadiene calculated by Natta from X-ray experiments to be 0.963 (G. Natta, J. Polymer Sci., 20, 251 (1956)). The value of $d_{am}$ used was 0.892 or the density of the 1,2-polybutadiene obtained by the synthesizing process proposed in U.S. Pat. No. 3,498,963 and found to be completely amorphous by X-ray analysis. The iodine number of the EPDM was determined by the following equation:

$$\text{Iodine number} = \frac{I_2 \text{ (molecular weight)}}{C=C \text{ (molecular weight)}} \times \frac{(\% \text{ by weight}}{\text{of diene})}$$

In the examples, parts are by weight unless otherwise specified.

EXAMPLE 1

1,2-Polybutadiene having a 1,2-addition unit content of 92.0 %, a crystallinity of 25 % and an intrinsic viscosity of 1.30 dl/g as measured in toluene at 30 °C (referred to hereinafter as 1,2-polybutadiene (A) and an ethylene-propylene-5-ethylidene-2-norbornene terpolymer rubber having a propylene content of 43 % by weight and an iodine number of 15 (referred to hereinafter as EPDM (A)) were mixed by a Banbury's mixer (in the case of vulcanizing system, they were mixed by rolls) with the prescription shown in Table 1 to prepare rubber compositions.

Table 1

| Ingredients blended \ Sample No. | 1 | 2 | 3 | 4 | 5 | 6 |
|---|---|---|---|---|---|---|
| EPDM (A) (part) | 100 | 95 | 90 | 85 | 70 | 60 |
| 1,2-Polybutadiene (A) (part) | 0 | 5 | 10 | 15 | 30 | 40 |
| Carbon black (HAF) (part) | 67.5 | 67.5 | 67.5 | 67.5 | 67.5 | 67.5 |
| Naphthenic extender oil (part) | 35 | 35 | 35 | 35 | 35 | 35 |
| Zinc oxide (part) | 5 | 5 | 5 | 5 | 5 | 5 |
| Stearic acid (part) | 1 | 1 | 1 | 1 | 1 | 1 |
| Accelerate CZ (N-cyclohexyl-2-benzothiazyl-sulfenamide) (part) | 2.5 | 2.5 | 2.5 | 2.5 | 2.5 | 2.5 |
| Sulfur (part) | 1.5 | 1.5 | 1.5 | 1.5 | 1.5 | 1.5 |
| Remarks | Comparative Example | Examples | | | | |

The resulting rubber compositions were subjected to measurement of vulcanization rate, green strength, extrusion rate, and die shrinkage, and vulcanizates obtained by vulcanizing the rubber compositions at 160°C for 15 min. were subjected to measurement of various physical properties to obtain the results shown in Table 2.

Table 2

| Measurement item \ Sample No. | 1 | 2 | 3 | 4 | 5 | 6 |
|---|---|---|---|---|---|---|
| Vulcanization Rate (Oscillating disk rheometer) | | | | | | |
| T90 (min. sec) | 15'24" | 14'12" | 13'24" | 12'42" | 11'48" | 11'12" |
| T90–T10 (min. sec) | 10'05" | 9'28" | 8'12" | 7'26" | 6'00" | 5'28" |
| Green strength (at room temperature) | | | | | | |
| 100 % modulus (kg/cm²) | 3.7 | 5.3 | 7.0 | 8.4 | 13.5 | 20.0 |
| Tensile strength (kg/cm²) | 4.3 | 5.8 | 7.5 | 9.6 | 17.1 | 29.1 |
| Elongation (%) | 400 | 390 | 380 | 380 | 380 | 390 |
| (at 40°C) | | | | | | |
| 100 % modulus (kg/cm²) | 2.9 | 3.1 | 3.5 | 4.2 | 8.0 | 13.0 |
| Tensile strength (kg/cm²) | 3.7 | 3.8 | 3.9 | 4.8 | 9.9 | 17.2 |
| Elongation (%) | 410 | 390 | 360 | 370 | 410 | 420 |
| (at 80°C) | | | | | | |
| 100 % modulus (kg/cm²) | 1.1 | 1.2 | 1.3 | 1.6 | 2.6 | 3.5 |
| Tensile strength (kg/cm²) | 1.5 | 1.6 | 1.6 | 1.9 | 3.5 | 4.8 |
| Elongation (%) | 390 | 360 | 340 | 340 | 330 | 310 |
| Extrusion test (1) | | | | | | |
| Extrusion rate (cc/min) | 244.0 | 265.0 | 290.5 | 288.0 | 271.0 | — |
| Die shrinkage (%) | 41.7 | 41.5 | 41.0 | 40.5 | 40.3 | — |
| Physical properties of vulcanizate | | | | | | |
| 300 % modulus (kg/cm²) | 130 | 131 | 133 | 134 | 138 | 142 |
| Tensile strength (kg/cm²) | 183 | 187 | 189 | 186 | 166 | 168 |
| Elongation (%) | 410 | 420 | 420 | 410 | 370 | 360 |
| Hardness (JIS Hs) | 69 | 71 | 73 | 74 | 77 | 79 |
| Tear strength (kg/cm) | 49 | 53 | 54 | 54 | 55 | 57 |
| Resilience (%) | 47 | 42 | 38 | 35 | 27 | 28 |

Table 2—Continued

| Measurement item | Sample No. | 1 | 2 | 3 | 4 | 5 | 6 |
|---|---|---|---|---|---|---|---|
| Compression permanent set (%) | | 18 | 18 | 18 | 19 | 21 | 25 |
| Crack-growing (2) | | | | | | | |
| 500 times | | 5.3 | — | 2.8 | — | 4.1 | — |
| 1000 times | | 9.3 | — | 4.2 | — | 5.7 | — |
| 3000 times | | 15.4 | — | 8.8 | — | 9.7 | — |
| Remarks | | Comparative Example | | Examples | | | |

Note:
(1) Extruder conditions were as follows:
Barrel temperature: 70°C
Die temperature: 105°C
Screw revolution: 21 rpm
(2) Numerals show the lengths of cracks (mm).

EXAMPLE 2

The 1,2-polybutadiene (A) and the EPDM (A) used in Example 1 were mixed with the prescription shown in Table 3 by means of a Banbury's mixer (in the case of vulcanizing system, they were mixed by rolls) to obtain rubber compositions.

The resulting rubber compositions were subjected to measurement of vulcanization rate, green strength and extursion rate to obtain the results shown in Table 4.

Table 4

| Measurement item | Sample No. | 7 | 8 | 9 | 10 | 11 |
|---|---|---|---|---|---|---|
| Vulcanization rate (Oscillating disk rheometer) | | | | | | |
| T90 | (min. sec) | 11'00" | 8'06" | 8'06" | 7'24" | 7'48" |
| T90–T10 | (min. sec) | 6'24" | 4'06" | 3'48" | 3'36" | 4'24" |
| Green strength (at room temperature) | | | | | | |
| Tensile strength (kg/cm²) | | 5.3 | 5.8 | 5.9 | 7.0 | 14.8 |
| Elongation (%) | | 290 | 220 | 210 | 200 | 220 |
| (at 50°C) | | | | | | |
| Tensile strength (kg/cm²) | | 3.5 | 4.0 | 4.4 | 4.8 | 11.0 |
| Elongation (%) | | 420 | 330 | 300 | 200 | 260 |
| (at 80°C) | | | | | | |
| Tensile strength (kg/cm²) | | 1.2 | 1.2 | 1.2 | 1.3 | 1.4 |
| Elongation (%) | | 470 | 430 | 360 | 340 | 240 |
| Extrusion rate (1) | (cc/min) | 180.3 | 198.4 | 202.3 | 205.6 | 212.5 |
| Remarks | | Comparative Example | Examples | | | |

(1) Extruder conditions were as follows:
Barrel temperature: 70°C
Die temperature: 110°C
Screw revolution: 21 rpm.

EXAMPLE 3

The 1,2-polybutadiene (A) used in Example 1, 1,2-polybutadiene having a 1,2-addition unit content of 89.7 %, a crystallinity of 15 % and an intrinsic viscosity Table 3

| Ingredients blended | Sample No. | 7 | 8 | 9 | 10 | 11 |
|---|---|---|---|---|---|---|
| EPDM (A) | (part) | 100 | 95 | 90 | 85 | 70 |
| 1,2-Polybutadiene (A) | (part) | 0 | 5 | 10 | 15 | 30 |
| Carbon black (HAF) | (part) | 67.5 | 67.5 | 67.5 | 67.5 | 67.5 |
| Naphthenic extender oil | (part) | 35 | 35 | 35 | 35 | 35 |
| Zinc oxide | (part) | 5 | 5 | 5 | 5 | 5 |
| Stearic acid | (part) | 1 | 1 | 1 | 1 | 1 |
| Accelerator TS (tetramethylthiuram monosulfide) | (part) | 1.5 | 1.5 | 1.5 | 1.5 | 1.5 |
| Accelerator M (2-mercaptobenzothiazole) | (part) | 0.5 | 0.5 | 0.5 | 0.5 | 0.5 |
| Sulfur | (part) | 1.5 | 1.5 | 1.5 | 1.5 | 1.5 |
| Remarks | | Comparative Example | Examples | | | | of 1.85 dl/g as measured in toluene at 30°C (referred to hereinafter as 1,2-polybutadiene (B)). 1,2-polybutadiene having a 1,2-addition unit content of 86.7 %, a crystallinity of 0 % and an intrinsic viscosity of 2.05 dl/g as measured in toluene at 30°C (hereinafter referred to as 1,2-polybutadiene (X)) for comparison, the EPDM (A) used in Example 1 and an ethylene-propylene-5-ethylidene-2-norbornene terpolymer rubber having a propylene content of 27 % by weight, and an iodine number of 15 (referred to hereinafter as EPDM (B)) were used in amounts shown in Table 5.

These components were mixed with the prescription shown in Table 5 by means of a Banbury's mixer (in the case of vulcanizing system, by means of rolls) to prepare rubber compositions.

Table 5

| Sample No. Ingredients blended | | 7 | 12 | 13 | 14 | 15 | 16 | 17 | 18 | 19 | 20 | 21 | 22 | 23 | 24 |
|---|---|---|---|---|---|---|---|---|---|---|---|---|---|---|---|
| EPDM (A) | (part) | 100 | 90 | 90 | 90 | 70 | 70 | 70 | — | — | — | — | — | — | — |
| EPDM (B) | (part) | — | — | — | — | — | — | — | 100 | 90 | 90 | 90 | 70 | 70 | 70 |
| 1,2-Polybutadiene (A) | (part) | — | 10 | — | — | 30 | — | — | — | 10 | — | — | 30 | — | — |
| " (B) | (part) | — | — | 10 | — | — | 30 | — | — | — | 10 | — | — | 30 | — |
| " (X) | (part) | — | — | — | 10 | — | — | 30 | — | — | — | 10 | — | — | 30 |
| Carbon black (HAF) | (part) | 67.5 | | | | | | | | | | | | | |
| Naphthenic extender oil | (part) | 35 | | | | | | | | | | | | | |
| Zinc oxide | (part) | 5 | | | | | | The same as left | | | | | | | |
| Stearic acid | (part) | 1 | | | | | | | | | | | | | |
| Accelerator TS | (part) | 1.5 | | | | | | | | | | | | | |
| Accelerator M | (part) | 0.5 | | | | | | | | | | | | | |
| Sulfur | (part) | 1.5 | | | | | | | | | | | | | |
| Remarks | | Comp. Ex. | Example | Comp. Ex. | Example | Comp. Ex. | Example | Comp. Ex. | Example | Comp. Ex. | Example | Comp. Ex. | Example | Comp. Ex. | |

The resulting rubber compositions were subjected to measurement of vulcanization rate, and green strength, and the vulcanizates obtained by vulcanizing the compositions at 160°C for 30 min. were subjected to measurement of hardness, crack-growth, resilience, and compression permanent set. The results obtained are shown in Table 6.

Table 6

| Sample No. Measurement items | 7 | 12 | 13 | 14 | 15 | 16 | 17 | 18 | 19 | 20 | 21 | 22 | 23 | 24 |
|---|---|---|---|---|---|---|---|---|---|---|---|---|---|---|
| Vulcanization rate (Oscillating disk rheometer) T90 (min. sec) | 11'00" | 8'06" | 8'00" | 7'30" | 8'18" | 8'54" | 7'48" | 11'24" | 8'24" | 7'54" | 6'30" | 8'48" | 9'00" | 7'42" |
| T90–T10 (min. sec) | 6'24" | 3'48" | 3'36" | 3'30" | 4'00" | 4'36" | 4'06" | 4'42" | 3'42" | 3'24" | 2'12" | 4'00" | 4'10" | 3'48" |
| Green strength (at room temp.) Tensile strength (kg/cm²) | 5.3 | 5.9 | 5.4 | 4.9 | 13.0 | 8.6 | 5.0 | 34 | 30 | 32 | 32 | 29 | 29 | 28 |
| Elongation (%) | 290 | 210 | 240 | 290 | 100 | 250 | 270 | 1150 | 1160 | 1200 | 1220 | 430 | 1090 | 1360 |
| (at 50°C) Tensile strength (kg/cm²) | 3.5 | 2.8 | 2.6 | 2.6 | 7.1 | 3.3 | 2.6 | 3.0 | 4.2 | 3.8 | 2.7 | 8.2 | 4.0 | 2.4 |
| Elongation (%) | 420 | 300 | 340 | 320 | 120 | 280 | 340 | 340 | 260 | 280 | 300 | 120 | 260 | 260 |
| at (80°C) Tensile strength (kg/cm²) | 1.2 | 1.2 | 1.2 | 1.2 | 2.1 | 1.2 | 1.3 | 1.7 | 1.7 | 1.7 | 1.5 | 2.8 | 1.7 | 1.5 |
| Elongation (%) | 470 | 360 | 420 | 460 | 220 | 300 | 380 | 380 | 340 | 320 | 320 | 180 | 260 | 260 |
| Physical properties of vulcanizate Hardness (JIS Hs) | 70 | 73 | 74 | 75 | 78 | 75 | 75 | 70 | 75 | 76 | 75 | 79 | 77 | 77 |
| Crack-growth* 100 times | 0.9 | 0.2 | 0.2 | 0.2 | — | — | — | 3.7 | — | — | — | 0.4 | 0.6 | 0.7 |
| 1000 times | 5.2 | 0.7 | 0.6 | 0.8 | — | — | — | 11.0 | — | — | — | 1.1 | 1.4 | 1.6 |
| 10000 times | 15.3 | 3.3 | 2.6 | 3.7 | — | — | — | ** | — | — | — | 5.3 | 6.0 | 16.9 |

Table 6—Continued

| Sample No. Measurement items | 7 | 12 | 13 | 14 | 15 | 16 | 17 | 18 | 19 | 20 | 21 | 22 | 23 | 24 |
|---|---|---|---|---|---|---|---|---|---|---|---|---|---|---|
| Resilience (%) | 50 | 36 | 38 | 41 | 35 | 36 | 41 | 58 | 42 | 43 | 45 | 40 | 41 | 45 |
| Compression permanent set (70) | 26 | 25 | 27 | 31 | 32 | 31 | 33 | 21 | 19 | 20 | 24 | 33 | 27 | 30 |
| Remarks | Comp. Ex. | Example | Comp. Ex. | Example | Comp. Ex. | Example | Comp. Ex. | Example | Comp. Ex. | Example | Comp. Ex. | Example | Comp. Ex. | Example |

Note: *Numerals refer to lengths of cracks (mm).
**Totally cracked.

EXAMPLE 4

1,2-Polybutadiene having a 1,2-addition unit content of 92.0 %, a crystallinity of 24 % and an intrinsic viscosity of 1.57 dl/g as measured in toluene at 30°C (referred to hereinafter as 1,2-polybutadiene (C)) and an ethylene-propylene-5-ethylidene-2-norbornene terpolymer rubber having a propylene content of 42 % by weight and an iodine number of 20 (referred to hereinafter as EPDM (C)) were mixed with the prescription shown in Table 7 by means of a Banbury's mixer (in the case of vulcanizing system, by means of rolls) to prepare rubber compositions.

Table 7

| Sample No. Ingredients blended | | 25 | 26 |
|---|---|---|---|
| EPDM (C) | (part) | 100 | 90 |
| 1,2-Polybutadiene (C) | (part) | 0 | 10 |
| Carbon black (HAF) | (part) | 5 | 5 |
| Magnesium silicate | (part) | 60 | 60 |
| Hard clay | (part) | 60 | 60 |
| Naphthenic extender oil | (part) | 6 | 6 |
| Paraffin wax | (part) | 5 | 5 |
| Zinc oxide | (part) | 5 | 5 |
| Stearic acid | (part) | 1 | 1 |
| Accelerator M | (part) | 2 | 2 |
| "TT" (tetramethylthiuram disulfide) | (part) | 0.5 | 0.5 |
| Accelerator TRA (dipentamethylenethiuram tetrasulfide) | (part) | 0.75 | 0.75 |
| Sulfur | (part) | 1.5 | 1.5 |
| Remarks | | Comparative Example | Example |

The resulting rubber compositions were subjected to measurement of vulcanization rate, green strength and extrusion rate, and the vulcanizates obtained by vulcanizing the rubber compositions at 160°C for 30 min. were subjected to measurement of elongation, hardness, 100 % modulus, 300 % modulus, tensile strength, tear strength, permanent elongation and compression permanent set. The results obtained are shown in Table 8.

Table 8

| Example No. Measurement item | | 25 | 26 |
|---|---|---|---|
| Vulcanization rate (CURELASTOMETER) | | | |
| T90 | (min, sec) | 19'00'' | 6'45'' |
| T90–T10 | (min, sec) | 17'30'' | 5'30'' |
| Green strength (at room temperature) | | | |
| Tensile strength | (kg/cm²) | 7 | 11 |
| Extrusion rate | (cc/min) | 293 | 347 |
| Physical properties of vulcanizate | | | |
| Elongation | (%) | 380 | 420 |
| Hardness | (JIS Hs) | 74 | 80 |
| 100 % modulus | (kg/cm²) | 48 | 51 |
| 300 % modulus | (kg/cm²) | 71 | 73 |
| Tensile strength | (kg/cm²) | 93 | 82 |
| Tear strength | (kg/cm) | 27 | 33 |
| Permanent elongation (%) | | 26 | 25 |
| Compression permanent set (%) | | 25 | 23 |
| Remarks | | Comparative Example | Example |

Note: The conditions of extruder were as follows:
Barrel temperature: 70°C
Die temperature: 90°C
Screw revolution: 30 r.p.m.

EXAMPLE 5

The 1,2-polybutadiene (A) and an ethylenepropylene-dicyclopentadiene terpolymer rubber having a propylene content of 38 % by weight and an iodine number of 15 (referred to hereinafter as EPDM (D)) were mixed with the prescription shown in Table 9 by means of a Banbury's mixer (in the case of vulcanizing system, by means of rolls) to prepare rubber compositions.

Table 9

| | | 27 | 28 | 29 | 30 | 31 |
|---|---|---|---|---|---|---|
| Ingredients blended | | | | | | |
| EPDM (D) | (part) | 100 | 95 | 90 | 85 | 70 |
| 1,2-Polybutadiene (A) | (part) | 0 | 5 | 10 | 15 | 30 |
| Carbon black (HAF) | (part) | 67.5 | 67.5 | 67.5 | 67.5 | 67.5 |
| Naphthenic extender oil | (part) | 35 | 35 | 35 | 35 | 35 |
| Zinc oxide | (part) | 5 | 5 | 5 | 5 | 5 |
| Stearic acid | (part) | 1 | 1 | 1 | 1 | 1 |
| Accelerator TS | (part) | 1.5 | 1.5 | 1.5 | 1.5 | 1.5 |
| Accelerator M | (part) | 0.5 | 0.5 | 0.5 | 0.5 | 0.5 |
| Sulfur | (part) | 1.5 | 1.5 | 1.5 | 1.5 | 1.5 |
| Remarks | | Comparative Example | Examples | | | |

Table 11

| Ingredients blended | | Sample No. 32 | 33 | 34 | 35 | 36 | 37 |
|---|---|---|---|---|---|---|---|
| EPDM (A) | (part) | 100 | 95 | 90 | 85 | 90 | 70 |
| 1,2-Polybutadiene (Y) | (part) | 0 | 5 | 10 | 15 | — | — |
| 1,2-Polybutadiene (Z) | (part) | — | — | — | — | 10 | 30 |
| Carbon black (HAF) | (part) | 67.5 | 67.5 | 67.5 | 67.5 | 67.5 | 67.5 |
| Naphthenic extender oil | (part) | 35 | 35 | 35 | 35 | 35 | 35 |
| Zinc oxide | (part) | 5 | 5 | 5 | 5 | 5 | 5 |
| Stearic acid | (part) | 1 | 1 | 1 | 1 | 1 | 1 |
| Accelerator TS | (part) | 1.5 | 1.5 | 1.5 | 1.5 | 1.5 | 1.5 |
| Accelerator M | (part) | 0.5 | 0.5 | 0.5 | 0.5 | 0.5 | 0.5 |
| Sulfur | (part) | 1.5 | 1.5 | 1.5 | 1.5 | 1.5 | 1.5 |
| Remarks | | Comparative Examples | | | | | |

The resulting rubber compositions were subjected to measurement of vulcanization rate and green strength to obtain the results shown in Table 10.

The resulting rubber compositions were subjected to measurement of green strength to obtain the results shown in Table 12.

Table 10

| Measurement Item | Sample No. 27 | 28 | 29 | 30 | 31 |
|---|---|---|---|---|---|
| Vulcanization rate (Oscillating disk rheometer) | | | | | |
| T90 (min, sec) | 22'00" | 18'12" | 17'30" | 15'40" | 15'15" |
| T90–T10 (min, sec) | 13'24" | 9'10" | 8'48" | 8'20" | 7'50" |
| Green strength (at room temperature) | | | | | |
| Tensile strength (kg/cm²) | 3.1 | 3.8 | 3.9 | 7.2 | 14.2 |
| Elongation (%) | 460 | 450 | 440 | 400 | 440 |
| (at 50°C) | | | | | |
| Tensile strength (kg/cm²) | 2.1 | 2.5 | 3.0 | 3.9 | 11.2 |
| Elongation (%) | 580 | 500 | 500 | 510 | 540 |
| (at 80°C) | | | | | |
| Tensile strength (kg/cm²) | 1.3 | 1.4 | 1.3 | 1.4 | 1.4 |
| Elongation (%) | 600 | 540 | 500 | 500 | 520 |
| Remarks | Comparative Example | | Examples | | |

COMPARATIVE EXAMPLES 1,2-Polybutadiene having a 1,2-addition unit content of 82.5 %, and an intrinsic viscosity of 0.25 dl/g as measured in toluene at 30°C (crystallinity was impossible to measure) (referred to hereinafter as 1,2-polybutadiene (Y)) or 1,2-polybutadiene having a 1,2addition unit content of 58.3 %, a crystallinity of 0 % and an intrinsic viscosity of 1.15 dl/g as measured in toluene at 30°C (referred to hereinafter as 1,2-polybutadiene (Z)), and the EPDM (A) were mixed with the prescription shown in Table 11 by means of rolls to prepare rubber compositions.

Table 12

| Measurement item | Sample No. 32 | 33 | 34 | 35 | 36 | 37 |
|---|---|---|---|---|---|---|
| Green strength (at room temperature) | | | | | | |
| Tensile strength (kg/cm²) | 5.0 | 4.7 | 4.3 | 3.8 | 5.0 | 4.8 |
| Elongation (%) | 300 | 450 | 520 | 680 | 290 | 280 |
| (at 50°C) | | | | | | |
| Tensile strength (kg/cm²) | 3.4 | 2.9 | 2.7 | 2.5 | 3.3 | 3.0 |
| Elongation (%) | 440 | 510 | 620 | 730 | 390 | 400 |
| (at 80°C) | | | | | | |
| Tensile strength (kg/cm²) | 1.3 | 1.2 | 1.0 | 1.0 | 1.2 | 1.0 |
| Elongation (%) | 490 | 600 | 690 | 770 | 450 | 420 |
| Remarks | Comparative Examples | | | | | |

What is claimed is:

1. An ethylene-propylene rubber composition comprising 3 to 50 % by weight of at least one 1,2-polybutadiene having a 1,2-addition unit content of at least 70 %, a crystallinity of at least 5 % and an intrinsic viscosity of at least 0.7 dl/g as measured in toluene at 30°C, and 97 to 50 % by weight of at least one ethylene-propylenediene terpolymer rubber.

2. An ethylene-propylene rubber composition according to claim 1, wherein the 1,2-polybutadiene has a 1,2-addition unit content of at least 85 %.

3. An ethylene-propylene rubber composition according to claim 1, wherein the 1,2-polybutadiene has a crystallinity of 5 to 50 %.

4. An ethylene-propylene rubber composition according to claim 1, wherein the 1,2-polybutadiene has a crystallinity of 10 to 30 %.

5. An ethylene-propylene rubber composition according to claim 1, wherein the 1,2-polybutadiene has an intrinsic viscosity of at least 1.0 dl/g as measured in toluene at 30°C.

6. An ethylene-propylene rubber composition according to claim 1, wherein the 1,2-polybutadiene has a 1,2-addition unit content of at least 85 %, a crystallinity of 10 to 30 % and an intrinsic viscosity of at least 1.0 dl/g as measured in toluene at 30°C.

7. An ethylene-propylene rubber composition according to claim 1, wherein the terpolymer rubber has an ethylene content of 50 to 80 % by weight, a propylene content of 50 to 20 % by weight and a diene content of up to 5 % by weight.

8. An ethylene-propylene rubber composition according to claim 1, which further contains at least one compounding ingredient selected from the group consisting of reinforcing agents, fillers, extender oils, pigments, vulcanizing agents, vulcanization accelerators, vulcanization activators, antioxidants, ultraviolet absorbers, blowing agents, odorants and softening agents.

9. A vulcanizate of the rubber composition according to claim 1.

* * * * *